(12) United States Patent
Arora et al.

(10) Patent No.: US 12,323,401 B2
(45) Date of Patent: Jun. 3, 2025

(54) PRIVACY-PRESERVING DATA DEDUPLICATION

(71) Applicant: Visa International Service Association, San Francisco, CA (US)

(72) Inventors: Sunpreet Singh Arora, Union City, CA (US); Saikrishna Badrinarayanan, Fremont, CA (US); Sikhar Patranabis, Palo Alto, CA (US); Srinivasan Raghuraman, Cambridge, MA (US); Kim Wagner, Sunnyvale, CA (US); Gaven James Watson, Palo Alto, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/839,825

(22) PCT Filed: Feb. 24, 2023

(86) PCT No.: PCT/US2023/063222
§ 371 (c)(1),
(2) Date: Aug. 20, 2024

(87) PCT Pub. No.: WO2023/164616
PCT Pub. Date: Aug. 31, 2023

(65) Prior Publication Data
US 2025/0112901 A1 Apr. 3, 2025

Related U.S. Application Data

(60) Provisional application No. 63/313,866, filed on Feb. 25, 2022.

(51) Int. Cl.
*H04L 9/40* (2022.01)
*G06F 16/215* (2019.01)
*H04L 9/30* (2006.01)

(52) U.S. Cl.
CPC ........ *H04L 63/0428* (2013.01); *G06F 16/215* (2019.01); *H04L 9/30* (2013.01)

(58) Field of Classification Search
CPC ...... H04L 63/0428; H04L 9/30; G06F 16/215
See application file for complete search history.

(56) References Cited

U.S. PATENT DOCUMENTS 10,691,825 B2 * 6/2020 Jones ..................... G06F 21/62
10,764,037 B2 9/2020 Yan
(Continued)

FOREIGN PATENT DOCUMENTS

CN 113259317 A 8/2021

OTHER PUBLICATIONS

PCT/US2023/063222, "International Search Report and the Written Opinion", Jun. 8, 2023, 9 pages.

*Primary Examiner* — Chau Le
(74) *Attorney, Agent, or Firm* — Kilpatrick Townsend & Stockton LLP

(57) ABSTRACT

A method includes a server computer receiving, from a first data provider computer, encrypted data derived from first identity data and a cryptographic key or derivative thereof stored at the first data provider computer. The server computer transmits, to a second data provider computer, the encrypted data and/or the cryptographic key or derivative thereof. The server computer receives, from the second data provider computer, intermediate data derived from second identity data stored at the second data provider computer. The server computer determines if the first identity data and the second identity data are duplicates while the first identity data and the second identity data are encrypted. The server computer removes one of encrypted first identity data, derived from the first identity data, and encrypted second (Continued)

identity data, derived from the second identity data, from a memory in the server computer.

20 Claims, 7 Drawing Sheets

(56) References Cited

U.S. PATENT DOCUMENTS

| | | | |
|---|---|---|---|
| 11,487,726 B1* | 11/2022 | Ippatapu | G06F 16/24564 |
| 2004/0243816 A1 | 12/2004 | Hacigumus et al. | |
| 2012/0173558 A1* | 7/2012 | Sorenson, III | G06F 16/215 |
| | | | 707/E17.014 |
| 2016/0057142 A1 | 2/2016 | Nayshtut et al. | |
| 2018/0060367 A1* | 3/2018 | Ioannou | G06F 16/215 |
| 2018/0307704 A1 | 10/2018 | Luthra et al. | |
| 2019/0173858 A1 | 6/2019 | Shin et al. | |
| 2020/0220870 A1 | 7/2020 | Wagner et al. | |
| 2022/0321342 A1* | 10/2022 | Davis | G06F 21/6218 |

* cited by examiner

PRIVACY-PRESERVING DATA DEDUPLICATION

CROSS-REFERENCES TO RELATED APPLICATIONS

This application is a National Stage of PCT Application No. PCT/US2023/063222, filed Feb. 24, 2023, which claims priority to U.S. Provisional Application 63/313,866, filed on Feb. 25, 2022, which are incorporated herein by reference in their entirety.

BACKGROUND

Deduplication can be used to remove copies of duplicate data stored in memory, on disk, or in the cloud, or wherever data resides. A computer can attempt to determine whether or not two or more pieces of data associated with a user are equal or similar. However, the data associated with the user may be sensitive data and may be encrypted to ensure the privacy of the user.

For example, the computer may obtain a first encrypted home address that was encrypted with a first cryptographic key from a first computer and a second encrypted home address that was encrypted with a second cryptographic key from a second computer, where the first cryptographic key and the second cryptographic key are different. The computer cannot simply compare the two encrypted values to one another to determine whether or not the sensitive data matches. Comparing encrypted data without revealing plaintext data is difficult.

Embodiments of the disclosure address this problem and other problems individually and collectively.

SUMMARY

One embodiment is related to a method comprising: receiving, by a server computer from a first data provider computer, encrypted data derived from first identity data and a cryptographic key or derivative thereof stored at the first data provider computer; transmitting, by the server computer to a second data provider computer, the encrypted data and/or the cryptographic key or derivative thereof; responsive to transmitting the encrypted data and/or the cryptographic key, receiving, by the server computer from the second data provider computer, intermediate data derived from second identity data stored at the second data provider computer; responsive to receiving the intermediate data, determining, by the server computer, if the first identity data and the second identity data are duplicates while the first identity data and the second identity data are encrypted; and responsive to determining if the first identity data and the second identity data are duplicates while the first identity data and the second identity data are encrypted, removing, by the server computer, one of encrypted first identity data, derived from the first identity data, and encrypted second identity data, derived from the second identity data, from a memory in the server computer.

Another embodiment is related to a server computer comprising: a processor; and a computer-readable medium coupled to the processor, the computer-readable medium comprising code executable by the processor for implementing operations comprising: receiving, from a first data provider computer, encrypted data derived from first identity data and a cryptographic key or derivative thereof stored at the first data provider computer; transmitting, to a second data provider computer, the encrypted data and/or the cryptographic key or derivative thereof; responsive to transmitting the encrypted data and/or the cryptographic key, receiving, from the second data provider computer, intermediate data derived from second identity data stored at the second data provider computer; responsive to receiving the intermediate data, determining if the first identity data and the second identity data are duplicates while the first identity data and the second identity data are encrypted; and responsive to determining if the first identity data and the second identity data are duplicates while the first identity data and the second identity data are encrypted, removing one of encrypted first identity data, derived from the first identity data, and encrypted second identity data, derived from the second identity data, from a memory in the server computer.

Another embodiment is related to a method comprising: receiving, by a data provider computer from a server computer, encrypted data derived from first identity data and/or a cryptographic key or derivative thereof; determining, by the data provider computer, intermediate data using the encrypted data and/or the cryptographic key or derivative thereof and second identity data; and providing, by the data provider computer, the intermediate data to the server computer, wherein the server computer determines if the first identity data and the second identity data are duplicates while the first identity data and the second identity data are encrypted and removes one of encrypted first identity data, derived from the first identity data, and encrypted second identity data, derived from the second identity data, from a memory in the server computer.

A better understanding of the nature and advantages of embodiments of the invention may be gained with reference to the following detailed description and accompanying drawings.

DETAILED DESCRIPTION

Figure 1:
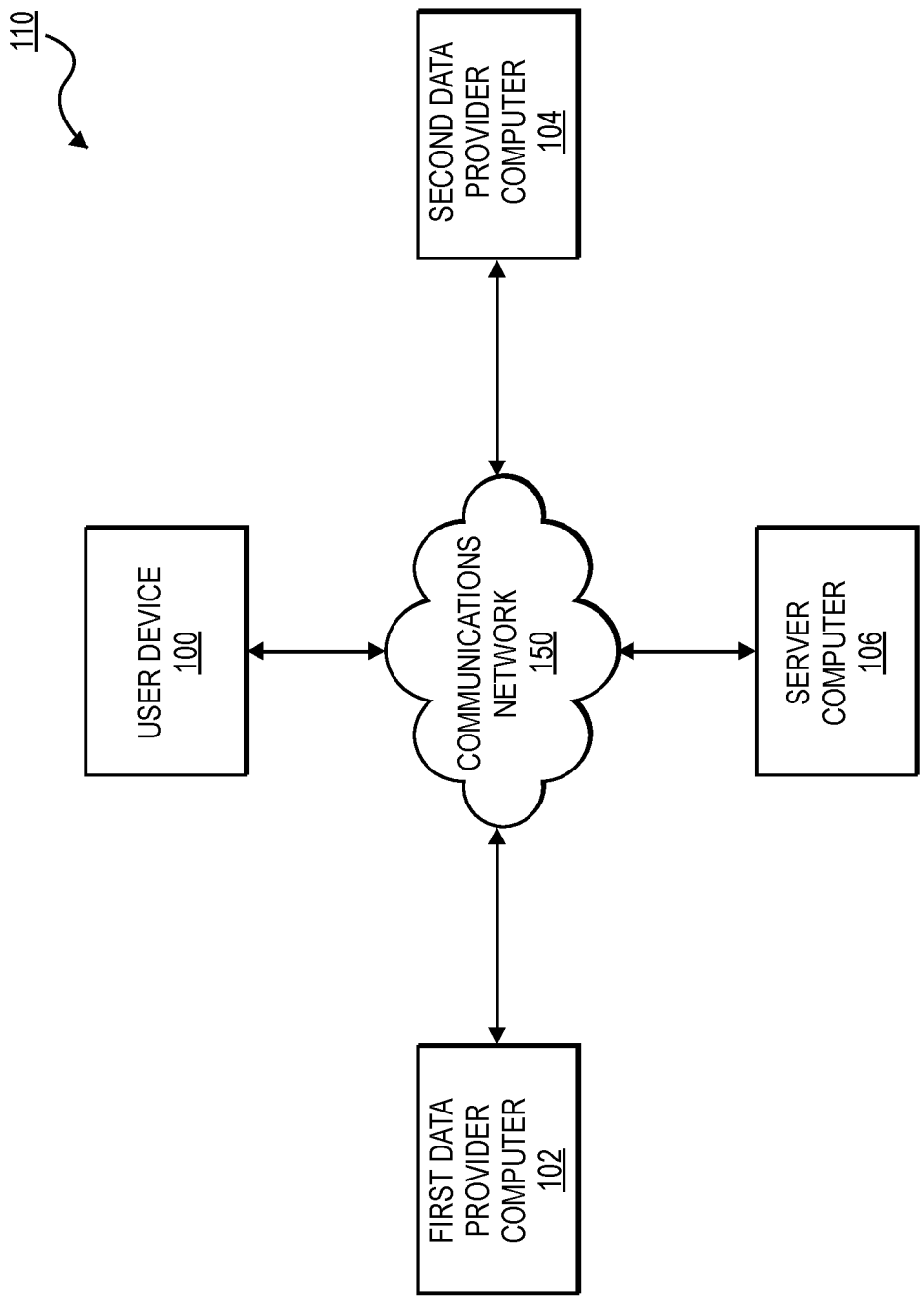
FIG. 1 shows a block diagram illustrating a data deduplication system according to embodiments.

Prior to discussing embodiments of the disclosure, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may be a device that is operated by a user. Examples of user devices may include a mobile phone, a smart phone, a card, a personal digital assistant (PDA), a laptop computer, a desktop computer, a server computer, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. A user device may also be a credit, debit, or prepaid card.

"Identity data" can include information related to characteristics of determining who or what a person or thing is. Identity data can include data values that represent an aspect of a user, identify the user, and/or include information about what the user has performed. For example, identity data can include a phone number, an address, a social security number, a birthdate, a height, a weight, a driver's license number, a passport number, an eye color, a credit card number, location data, etc.

"Intermediate data" can include information that occurs between two things in time, place, or order. Intermediate data can include data that occurs during processing of identity data deduplication. Intermediate data can include data obtained from processing encrypted data and then used for processing a comparison between two pieces of encrypted identity data.

A "comparison value" can include a numerical amount that indicates a consideration or estimate of the similarities or dissimilarities between two things. A comparison value can include a numerical amount that indicates how closely two values match. For example, a comparison value can indicate how similar first identity data is to second identity data.

A "key" or "encryption key" may include a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "public key" may include an encryption key that may be shared openly and publicly. The public key may be designed to be shared and may be configured such that any information encrypted with the public key may only be decrypted using a secret key associated with the public key (i.e., a public/secret key pair).

A "secret key" may include any encryption key that may be protected and secure. A secret key may be securely stored at an entity and may be used to decrypt any information that has been encrypted with an associated public key of a public/secret key pair associated with the secret key. A secret key may also be a private key.

A "public/secret key pair" may refer to a pair of linked cryptographic keys generated by an entity. The public key may be used for public functions such as encrypting a message to send to the entity or for verifying a digital signature which was supposedly made by the entity. The secret key, on the other hand may be used for private functions such as decrypting a received message or applying a digital signature. In some embodiments, the public key may be authorized by a body known as a Certification Authority (CA) which stores the public key in a database and distributes it to any other entity which requests it. The secret key can typically be kept in a secure storage medium and will usually only be known to the entity. Public and secret keys may be in any suitable format, including those based on Rivest-Shamir-Adleman (RSA) or elliptic curve cryptography (ECC).

A "trapdoor" may be a function that is easy to compute in one direction, yet difficult to compute in the opposite direction. In mathematical terms, if f is a trapdoor function, then there exists some secret information td, such that given f (x) and td, it is easy to compute x. A trapdoor can be utilized in public key encryption with equality test (PKEET). PKEET is a cryptosystem that allows a computer that has trapdoor(s) issued by one or more other devices Ui to perform equality tests on ciphertexts encrypted using public key(s) of the other devices Ui.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

FIG. 1 shows a data deduplication system 110 according to embodiments. The data deduplication system 110 can comprise a user device 100 operated by a user, a first data provider computer 102, a second data provider computer 104, a server computer 106, and a communications network 150.

The user device 100 can be in operative communication with the first data provider computer 102 and the second data provider computer 104 via the communications network 150. The first data provider computer 102 can be in operative communication with the user device 100, the second data provider computer 104, and the server computer 106 via the communications network 150. The second data provider computer 104 can be in operative communication with the user device 100, the first data provider computer 102, and the server computer 106 via the communications network 150. The server computer 106 can be in operative communication with the first data provider computer 102 and the second data provider computer 104 via the communications network 150.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. For example, the system 110 can include a plurality of user devices and a plurality of data provider computers.

Messages between at least the devices of system 110 in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network 150 may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network 150 can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The user device 100 can include a device operated by a user. The user device 100 can be a computing device, such as a desktop computer, a laptop computer, a smartphone, a tablet computer, a smartwatch, and/or any other computer that can be operated by a user.

The user device 100 can allow a user to communicate with other devices. For example, the user device 100 can communicate with a first data provider computer 102 and a second data provider computer 104. The user device 100 can provide sensitive data, such as identity data, to the first data provider computer 102 and/or the second data provider computer 104 over secure channels in the communications network 150. In some embodiments, the user of the user device 100 can provide the identity data to the data provider computer(s) in any suitable manner offered by the data provider computer(s). The user device 100 can provide the identity data to the data provider computer(s) in order to perform a service with the data provider computer(s).

The first data provider computer 102 and the second data provider computer 104 may be operated by an entity that can provide data of a user. The first data provider computer 102 and the second data provider computer 104 can obtain identity data representing the user of the user device 100. The first data provider computer 102 and the second data provider computer 104 can provide encrypted identity data to the server computer 106. Both the first data provider computer 102 and the second data provider computer 104 may provide encrypted identity data, representative of the user of the user device 100, to the server computer 106. The first data provider computer 102 and the second data provider computer 104 may provide the encrypted identity data to the server computer 106 upon obtaining the identity data from the user device 100 or upon receiving an identity data request message from the server computer 106. The first data provider computer 102 and the second data provider computer 104 may end up providing the same identity data or different identity data to the server computer 106.

The first data provider computer 102 and the second data provider computer 104 can be authorizing entity computers. For example, the first data provider computer 102 can be an authorizing entity computer that is a bank computer that can obtain a full name and a home address of the user of the user device 100. The second data provider computer 104 can be an authorizing entity computer that is a governmental agency computer that can obtain a full name and a home address of the user of the user device 100.

The first data provider computer 102 and the second data provider computer 104 can store cryptographic keys that can be utilized to encrypt the identity data (e.g., the full name and the home address). The first data provider computer 102 and the second data provider computer 104 can provide the encrypted identity data to the server computer 106 for storage and use by the server computer 106 in a service or process accessible by the user device 100 (e.g., such as a transaction processing method).

The server computer 106 can be a computer that stores encrypted identity data and performs processing using the encrypted identity data. For example, the server computer 106 can perform a transaction process along with the user device 100 to process a transaction using the encrypted identity data. In some embodiments, the server computer 106 can be a network processing computer that includes data processing subsystems, networks, and operations used to support and deliver authorization services, exception file services, and clearing and settlement services. An exemplary network processing computer may include VisaNet®. Network processing computers such as VisaNet® are able to process credit card transactions, debit card transactions, and other types of commercial transactions. VisaNet® in particular, includes a VIP system (Visa Integrated Payments system) which processes authorization requests and a Base II system which performs clearing and settlement services.

The server computer 106 may store encrypted identity data associated with the user of the user device 100 as well as for a plurality of other users of a plurality of other user devices (not shown). The server computer 106 can store encrypted identity data in a memory or a database. The server computer 106 can determine whether or not any two encrypted identity data match, while remaining encrypted from the viewpoint of the server computer 106. The server computer 106 can perform a data deduplication process to remove any duplicate encrypted identity data from the memory or the database as described in further detail in reference to the methods illustrated in FIGS. 4-7.

Each computer and device shown in the data deduplication system 110 of FIG. 1 can be associated with public/secret key pairs. For example, the first data provider computer 102 may be associated with a first public key, PK, and a first secret key, SK, and the second data provider computer 104 may be associated with a second public key, pk, and a second secret key, sk.

As an illustrative example, the first data provider computer 102 and the second data provider computer 104 can each provide multiple encrypted identity data including a full name (e.g., "Jane Doe"), a home address (e.g., "123 Sesame Street"), and an account number (e.g., "123456789012345") of the user to the server computer 106. The server computer 106 may store the received encrypted identity data in memory. To reduce the amount of data stored by the server computer 106, the server computer 106 can perform deduplication on all received encrypted data. Further, due to the potential sensitivity of the data, the server computer 106 may wish to perform the deduplication without learning (e.g., decrypting) the underlying identity data of the user.

Figure 2:
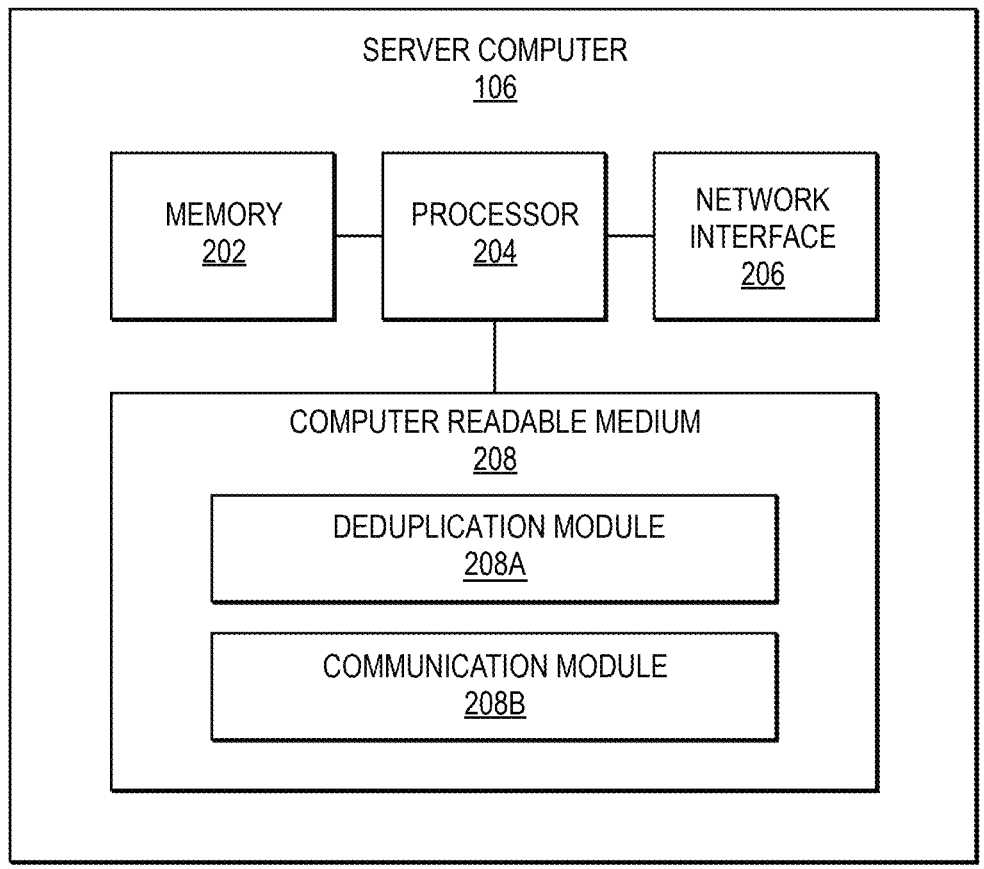
FIG. 2 shows a block diagram illustrating components of a server computer according to embodiments.

FIG. 2 shows a block diagram of a server computer 106 according to embodiments. The exemplary server computer 106 may comprise a processor 204. The processor 204 may be coupled to a memory 202, a network interface 206, and a computer readable medium 208. The computer readable medium 208 can comprise a deduplication module 208A and a communication module 208B.

The memory 202 can be used to store data and code. For example, the memory 202 can store encrypted identity data, public keys, private keys, etc. The memory 202 may be coupled to the processor 204 internally or externally (e.g., cloud based data storage), and may comprise any combination of volatile and/or non-volatile memory, such as RAM, DRAM, ROM, flash, or any other suitable memory device.

The computer readable medium 208 may comprise code, executable by the processor 204, for performing a method comprising: receiving, from a first data provider computer, encrypted data derived from first identity data and a cryptographic key or derivative thereof stored at the first data provider computer; transmitting, to a second data provider computer, the encrypted data and/or the cryptographic key or derivative thereof; responsive to transmitting the encrypted data and/or the cryptographic key, receiving, from the second data provider computer, intermediate data derived from second identity data stored at the second data provider computer; responsive to receiving the intermediate data, determining if the first identity data and the second identity data are duplicates while the first identity data and the second identity data are encrypted; and responsive to determining if the first identity data and the second identity data are duplicates while the first identity data and the second identity data are encrypted, removing one of encrypted first identity data, derived from the first identity data, and encrypted second identity data, derived from the second identity data, from a memory in the server computer.

The deduplication module 208A may comprise code or software, executable by the processor 204, for determining duplicate data entries in a memory and removing duplicate data entries from the memory. The deduplication module 208A, in conjunction with the processor 204, can determine duplicate data entries while the data entries are encrypted. The deduplication module 208A, in conjunction with the processor 204, can communicate, via the communication module 208B, with first data provider computer and the second data provider computer to determine whether or not encrypted first identity data, which is derived from first identity data, matches encrypted second identity data, which is derived from second identity data.

The deduplication module 208A, in conjunction with the processor 204, can obtain encrypted data from a first data provider computer. The encrypted data can be derived from first identity data stored by the first data provider computer. The first data provider computer may have previously or concurrently provided encrypted first identity data to the server computer 106. The deduplication module 208A, in conjunction with the processor 204, may also receive a cryptographic key or derivative thereof from the first data provider computer. The deduplication module 208A, in conjunction with the processor 204, can also receive intermediate data from a second provider computer. The intermediate data can be derived from second identity data stored at the second data provider computer. The second data provider computer may have previously provided encrypted second identity data to the server computer 106.

The deduplication module 208A, in conjunction with the processor 204, can determine if the first identity data and the second identity data are duplicates while the first identity data and the second identity data are encrypted based on the encrypted data and/or the intermediate data received from the first data provider computer and the second data provider computer, respectively. The deduplication module 208A, in conjunction with the processor 204, can remove one of the encrypted first identity data, derived from the first identity data, and the encrypted second identity data, derived from the second identity data, from a memory in the server computer 106 to remove the duplicate data, if the two encrypted identity data match.

The deduplication module 208A, in conjunction with the processor 204, can determine if the first identity data and the second identity data are duplicates in a number of different manners as discussed in further detail herein.

The communication module 208B may comprise code or software, executable by the processor 204, for communicating with other devices. The communication module 208B may be configured or programmed to perform some or all of the functionality associated with receiving, sending, and generating electronic messages for transmission through the server computer 106 to or from any of the entities shown in FIG. 1. When an electronic message is received by the server computer 106 via the network interface 206, it may be passed to the communication module 208B. The communication module 208B may identify and parse the relevant data based on a particular messaging protocol used in the server computer 106. As examples, the received information may comprise encrypted identity data, cryptographic keys or derivatives thereof, etc. The communication module 208B may then transmit any received information to an appropriate module and/or component within the server computer 106. The communication module 208B may also receive information from one or more of the modules in the server computer 106 and generate an electronic message in an appropriate data format in conformance with a transmission protocol used in the server computer 106 so that the message may be sent to one or more entities within system 110. The electronic message may then be passed to the network interface 206 for transmission. The electronic message may, for example, comprise a message or any other suitable electronic message.

The network interface 206 may include an interface that can allow the server computer 106 to communicate with external computers. The network interface 206 may enable the server computer 106 to communicate data to and from another device (e.g., the first data provider computer 102, the second data provider computer 104, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 3:
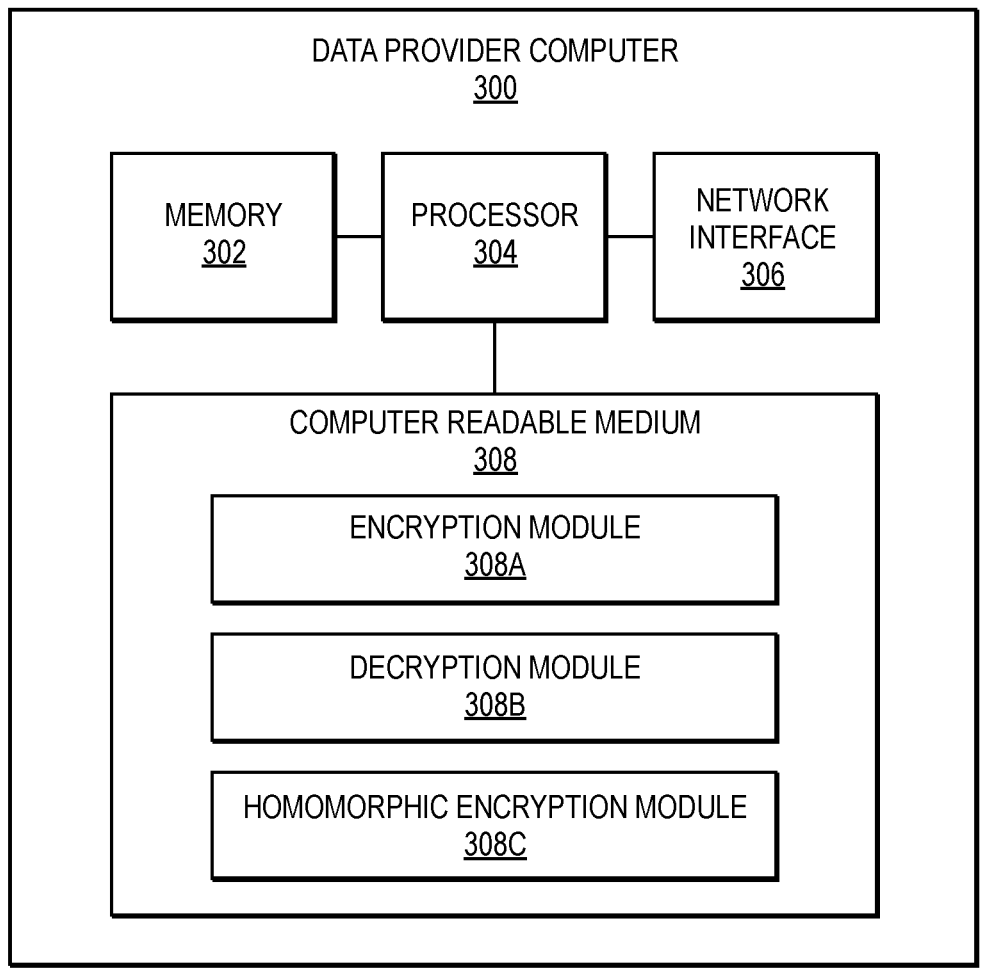
FIG. 3 shows a block diagram illustrating components of a data provider computer according to embodiments.

FIG. 3 shows a block diagram of a data provider computer 300 according to embodiments. The exemplary data provider computer 300 may comprise a processor 304. The processor 304 may be coupled to a memory 302, a network interface 306, and a computer readable medium 308. The computer readable medium 308 can comprise an encryption module 308A, a decryption module 308B, and a homomorphic encryption module 308C.

The memory 302 can be used to store data and code and may be similar to the memory 202 as described herein. For example, the memory 302 can store encrypted identity data, identity data, public keys, private keys, etc.

The computer readable medium 308 may comprise code, executable by the processor 304, for performing a method comprising: receiving, by a data provider computer from a server computer, encrypted data derived from first identity data and/or a cryptographic key or derivative thereof; determining, by the data provider computer, intermediate data using the encrypted data and/or the cryptographic key or derivative thereof and second identity data; and providing, by the data provider computer, the intermediate data to the server computer, wherein the server computer determines if the first identity data and the second identity data are duplicates while the first identity data and the second identity data are encrypted and removes one of encrypted first identity data, derived from the first identity data, and encrypted second identity data, derived from the second identity data, from a memory in the server computer.

The encryption module 308A may comprise code or software, executable by the processor 304, for encrypting data. The encryption module 308A, in conjunction with the processor 304, can encrypt any data stored by the data provider computer 300 or received from another device. For example, the encryption module 308A, in conjunction with the processor 304, can encrypt identity data using a data provider computer secret key to obtain encrypted identity data. The data provider computer secret key can be a secret key generated specifically for encrypting identity data to keep the sensitive data held within secure from other devices.

The decryption module 308B may comprise code or software, executable by the processor 204, for decrypting data. The decryption module 308B, in conjunction with the processor 304, can decrypt encrypted data received from other devices. For example, the decryption module 308B, in conjunction with the processor 304, can receive an encrypted master secret key from a server computer from a different data provider computer. The encrypted master secret key can be encrypted using a public key of the data provider computer 300. The decryption module 308B, in conjunction with the processor 304, can use a private key of the data provider computer 300 that corresponds to the public key to decrypt the encrypted master secret key to obtain a master secret key.

The homomorphic encryption module 308C can include may comprise code or software, executable by the processor 204, for performing homomorphic encryption related operations. The homomorphic encryption module 308C, in conjunction with the processor 304, can perform mathematical operations on encrypted data. There needs to be a relationship between plaintext and ciphertext for homomorphic encryption to perform mathematical operations on encrypted data. Plaintext can be ordinary readable text, while ciphertext can be encrypted text that is transformed from plaintext using an encryption algorithm. The homomorphic encryption module 308C, in conjunction with the processor 304, can add or multiply together two ciphertexts as if the operation were performed on two plaintexts. Homomorphic encryption is implemented so that it is hidden from observers.

The homomorphic encryption module 308C, in conjunction with the processor 304, can perform additive homomorphic operations and multiplicative homomorphic operations. If an algorithm is additively homomorphic, then adding two ciphertexts together provides the same result as encrypting the sum of the two plaintexts. If an algorithm is multiplicatively homomorphic, then multiplying two encrypted ciphertexts with the same key is equivalent to raising the product of plaintexts to the power of a secret key.

The homomorphic encryption module 308C, in conjunction with the processor 304, can implement an ElGamal homomorphic cryptosystem. For example, the ElGamal homomorphic cryptosystem can be implemented as follows. In a cyclic group G of order q with generator g, if the public key is (G, q, g, h), where $h=g^x$, and x is the secret key, then the encryption of a message m is $Enc(m)=(g^r, m \cdot h^r)$, for some random $r \in \{0, \ldots, q-1\}$. An exemplary homomorphic property (multiplicatively) between two encrypted messages can be shown as:

$$Enc(m_1) \cdot Enc(m_2) = (g^{r_1}, m_1 \cdot h^{r_1})(g^{r_2}, m_2 \cdot h^{r_2})$$

$$Enc(m_1) \cdot Enc(m_2) = (g^{r_1+r_2}, (m_1 \cdot m_2) h^{r_1+r_2})$$

$$Enc(m_1) \cdot Enc(m_2) = Enc(m_1 \cdot m_2)$$

The network interface 306 may be similar to the network interface 206 and will not be repeated here.

Figure 4:
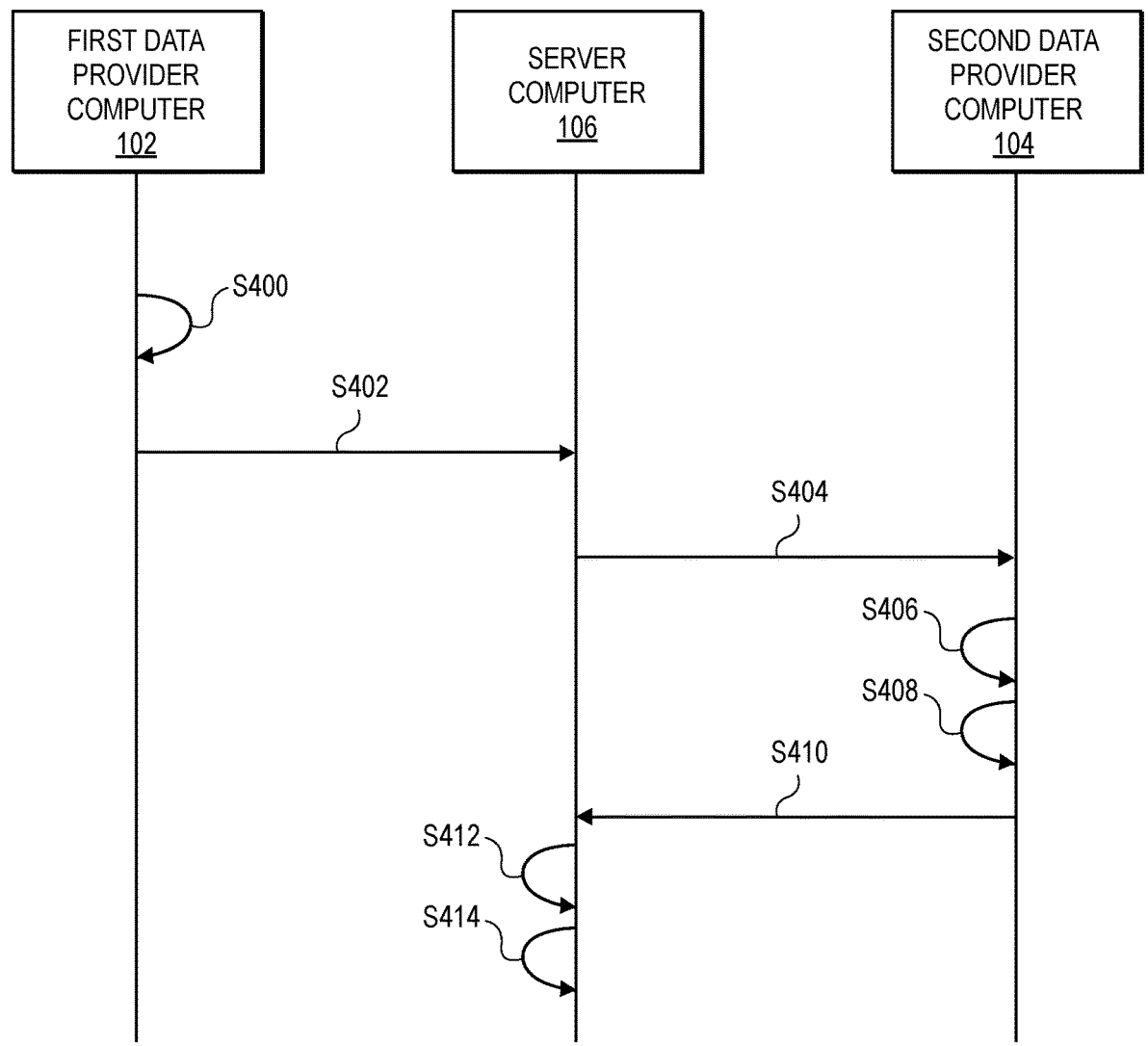
FIG. 4 shows a flowchart illustrating an example data deduplication method according to embodiments.

FIG. 4 shows a flowchart illustrating a data deduplication method according to embodiments. The method illustrated in FIG. 4 will be described in the context of the first data provider computer 102 and the second data provider computer 104 providing first encrypted identity data and second encrypted identity data, respectively, to the server computer 106. The server computer 106 can initiate a deduplication process to delete either the first encrypted identity data or second encrypted identity data, or to store both. It is understood, however, that the invention can be applied to other circumstances. Further details and additional processing steps are described in reference to the methods illustrated in FIGS. 5-7.

Prior to step S400, the first data provider computer 102 can obtain first identity data from a user device. The second data provider computer 104 can obtain second identity data from the user device.

The second data provider computer 104 can encrypt the second identity data using a second data provider computer public key that is used for keeping identity data secure. The second data provider computer 104 can transmit the encrypted second identity data to the server computer 106. The server computer 106 can store the encrypted second identity data in memory.

In some embodiments, the first data provider computer 102 can encrypt the first identity data using a first data provider computer public key that is used for keeping identity data secure. The first data provider computer 102 can transmit the encrypted first identity data to the server computer 106. The server computer 106 can store the encrypted first identity data in memory.

In some embodiments, upon receiving both the encrypted first identity data and the encrypted second identity data, the server computer 106 can determine whether or not to perform a data deduplication process on the encrypted first identity data and the encrypted second identity data. The server computer 106 can generate a data deduplication request message requesting encrypted data derived from the first identity data and a cryptographic key or derivative thereof from the first data provider computer. The encrypted data derived from the first identity data and a cryptographic key or derivative thereof can aid the server computer 106 with performing the deduplication process. The server computer 106 can then provide the data deduplication request message to the first data provider computer.

In other embodiments, the server computer 106 can receive the encrypted first identity data along with the encrypted data derived from the first identity data and a cryptographic key or derivative thereof, which aid in deduplication, during step S402.

At step S400, the first data provider computer 102 can encrypt the first identity data to form encrypted data using a cryptographic key or derivative thereof stored by the first data provider computer 102. The first data provider computer 102 can encrypt the first identity data in a number of different ways, as described below with reference to the methods illustrated in FIGS. 5-7.

At step S402, the first data provider computer 102 can provide the encrypted data and the cryptographic key or derivative thereof to the server computer 106. The server computer 106 can receive the encrypted data that is derived from the first identity data and receive the cryptographic key or derivative thereof. The contents of the first identity data and the cryptographic key or derivative thereof are further described in reference to the methods illustrated in FIGS. 5-7.

In other embodiments, if the first data provider computer 102 has not yet transmitted the encrypted first identity data to the server computer 106 (e.g., prior to step S400), then the first data provider computer 102 can transmit the encrypted first identity data along with the data sent during step S402, namely the encrypted data and the cryptographic key or derivative thereof.

At step S404, after receiving the encrypted data and the cryptographic key or derivative thereof from the first data provider computer 102, the server computer 106 can transmit the encrypted data and/or the cryptographic key or derivative thereof to the second data provider computer 104. The server computer 106 can provide the encrypted data and/or the cryptographic key or derivative thereof to the second data provider computer 104 to determine if the encrypted data includes identity data that matches encrypted second identity data. In some embodiments, the server computer 106 may have previously received the encrypted second identity data from the second data provider computer 104.

At step S406, after receiving the encrypted data derived from the first identity data and/or the cryptographic key or derivative thereof from the server computer 106, the second data provider computer 104 can determine intermediate data. The second data provider computer 104 can derive the intermediate data from second identity data stored at the second data provider computer 104. The derivation of the intermediate data is further described in reference to the methods illustrated in FIGS. 5-7.

At step S408, after determining the intermediate data, the second data provider computer 104 can provide the intermediate data to the server computer 106. In some embodiments, the message provided from the second data provider computer 104 to the server computer 106 that includes the intermediate data can also include the encrypted data and/or the cryptographic key or derivative thereof.

At step S410, after receiving the intermediate data derived from the second identity from the second data provider computer, the server computer 106 can determine if the first identity data and the second identity data are duplicates while the first identity data and the second identity data are encrypted. Determining duplicates is further described in reference to the methods illustrated in FIGS. 5-7.

At step S412, responsive to determining if the first identity data and the second identity data are duplicates while the first identity data and the second identity data are encrypted, the server computer 106 can remove one of encrypted first identity data, derived from the first identity data, and encrypted second identity data, derived from the second identity data, from a memory in the server computer 106. By removing one of the duplicates the server computer 106 can reduce storage memory usage.

Further details of examples of steps S400-S412 will be described in reference to FIGS. 5-7.

Figure 5:
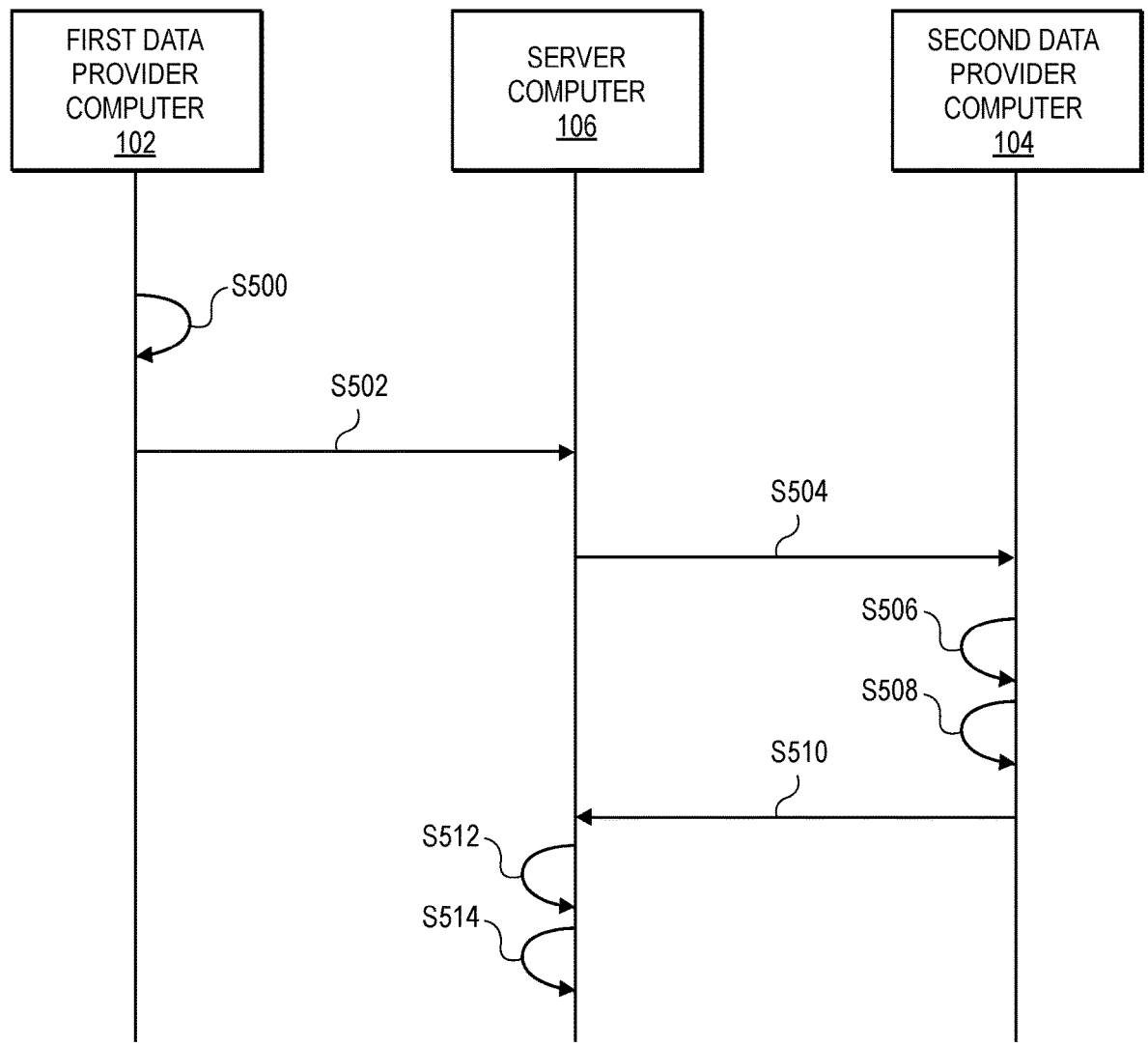
FIG. 5 shows a flowchart illustrating first details of a data deduplication method according to embodiments.

FIG. 5 shows a flowchart illustrating first details of a data deduplication method according to embodiments. The method illustrated in FIG. 5 will be described in the context of performing a deduplication method utilizing homomorphic encryption. It is understood, however, that the invention can be applied to other circumstances.

Homomorphic encryption, denoted by HE.Enc herein, can be used to encrypt identity data of a user. Homomorphic encryption is the conversion of data into ciphertext that can be analyzed and worked with as if it were still in its original (e.g., plaintext) form. Homomorphic encryption enables complex mathematical operations to be performed on encrypted data without compromising the encryption. One such example of homomorphic encryption includes ElGamal. Additively homomorphic encryption can be used with distance measures such as equality, inner products, or hamming distances on bit strings. Fully homomorphic encryption can be used for any other arbitrary distance measure. Homomorphic encryption schemes can preserve computations through the encrypted domain.

The second data provider computer 104 may be associated with a public/secret key pair, such as a second public key pk and a second secret key sk used in a public key encryption scheme. The first data provider computer 102 may hold first identity data id_1 of the user. The second data provider computer 104 may hold second identity data id_2 of the user.

Prior to step S500, the second data provider computer 104 can encrypt the second identity data id_2 using a second data provider computer public key that is used for keeping identity data secure. The second data provider computer 104 can transmit the encrypted second identity data to the server computer 106. The server computer 106 can store the encrypted second identity data in memory.

The first data provider computer 102 can obtain the second public key pk from the second data provider computer 104. For example, the first data provider computer 102 may either communicate with the second data provider computer 104 to retrieve the second public key pk or the first data provider computer 102 may retrieve the second public key pk from memory. The first data provider computer 102 may then generate a public/secret key pair for a homomorphic encryption scheme, such as a first public key PK and a first secret key SK.

At step S500, the first data provider computer 102 can encrypt the first identity data id_1 according to the homomorphic encryption scheme. The first data provider computer 102 can encrypt the first identity data using the first public key PK to generate encrypted first identity data HE.Enc(PK, id_1). The first data provider computer 102 may then use a public key encryption scheme to encrypt the encrypted first identity data HE.Enc(PK, id_1) using the second public key pk to generate doubly encrypted first identity data Enc(pk, HE.Enc(PK, id_1)) (which is an example of encrypted data).

At this point, the server computer 106 can store both the encrypted first identity data and the encrypted second identity data in memory. Upon receiving the encrypted first identity data, the server computer 106 can continue to perform the privacy-preserving deduplication process.

At step S502, after generating the doubly encrypted first identity data Enc(pk, HE.Enc(PK, id_1)), the first data provider computer 102 may transmit the first public key PK, the first secret key SK, and the doubly encrypted first identity data Enc(pk, HE.Enc(PK, id_1)) to the server computer 106. In some embodiments, the first data provider computer 102 may use an additional key pair, which is a signing/verification key pair, to generate a digital signature on the first public key PK, the first secret key SK, and the doubly encrypted first identity data Enc(pk, HE.Enc(PK, id_1)).

At step S504, after receiving the first public key PK, the first secret key SK, and the doubly encrypted first identity data Enc(pk, HE.Enc(PK, id_1)) from the first data provider computer 102, the server computer 106 may transmit the first public key PK and the doubly encrypted first identity data Enc(pk, HE.Enc(PK, id_1)) to the second data provider computer 104.

In some embodiments, the server computer 106 may verify the authenticity of the data received from the first data provider computer 102. For example, the server computer 106 may retrieve the verification key of the first data provider computer 102 to verify the digital signature on the first public key PK, the first secret key SK, and the doubly encrypted first identity data Enc(pk, HE.Enc(PK, id_1)).

At step S506, after receiving the first public key PK and the doubly encrypted first identity data Enc(pk, HE.Enc(PK, id_1)) from the server computer 106, the second data provider computer 104 may use the second secret key, sk, to remove a layer of encryption from the doubly encrypted first identity data to obtain singly encrypted first identity data. For example, the second data provider computer 104 can decrypt the doubly encrypted first identity data Enc(pk, HE.Enc(PK, id_1)) using the second secret key to obtain the encrypted first identity data HE.Enc(PK, id_1).

At step S508, the second data provider computer 104 may then use the homomorphic encryption scheme and a distance measure, denoted by f( ), to generate intermediate data HE.Enc(PK, f(id_1, id_2)) between the first identity data id_1 and second identity data id_2, which is stored by the second data provider computer. The intermediate data HE.Enc(PK, f(id_1, id_2)) can be an encrypted comparison value that indicates how well the first identity data id_1 and the second identity data id_2 match.

Example distance measures f( ) for bit-type data (e.g., numerical data) can include equality, hamming distance, cosine similarity, and the like. Example distance measures f( ) for string-type data can include Soundex and the like. The distance measure f( ) can determine a distance between the two data items that are being compared (e.g., the distance between the first identity data id_1 and the second identity data id_2). The distance between the first identity data id_1 and the second identity data id_2 can indicate how closely the two values match. For example, if the distance value is small, then the first identity data id_1 and the second identity data id_2 can be the same value. If the distance value is large, then the first identity data id_1 and the second identity data id_2 can be different values. A predetermined distance threshold can be utilized to signify a distance at which the values no longer match. In some embodiments, the comparison value f(id_1, id_2) can be a value of True or False that indicates whether or not the identity data matches.

At step S510, after generating the intermediate data HE.Enc(PK, f(id_1, id_2)), which is an encrypted distance value between the first identity data id_1 and the second identity data id_2, the second data provider computer 104 can transmit the intermediate data HE.Enc(PK, f(id_1, id_2)) to the server computer 106.

At step S510, after receiving the intermediate data HE.Enc(PK, f(id_1, id_2)) from the second data provider computer 104, the server computer 106 can obtain the comparison value f(id_1, id_2) from the intermediate data HE.Enc(PK, f(id_1, id_2)). The server computer 106 can decrypt the intermediate data HE.Enc(PK, f(id_1, id_2)) using the first secret key SK to retrieve the comparison value f(id_1, id_2). The comparison value f(id_1, id_2) can be used to determine if the first identity data id_1 and the second identity data id_2 are duplicate data (e.g., the same data). For example, if the distance measure, f( ), is equality then the result will be either True or False.

At step S514, if the result is True, the first identity data and the second identity data are the same and thus the server computer 106 may remove either the first identity data, or the second identity data from memory. If the result is False, the first identity data and the second identity data are not the same, and thus the server computer 106 may maintain both the first identity data and the second identity data in memory.

As an example, the method illustrated in FIG. 5 can comprise receiving, by a server computer from a first data provider computer, a first public key (PK), a first secret key (SK), and doubly encrypted first identity data (Enc(pk, HE.Enc(PK, id_1))), wherein the doubly encrypted first identity data comprises first identity data (id_1) encrypted using the first public key (PK) and a second public key (pk); transmitting, by the server computer to a second data provider computer, the first public key (PK) and the doubly encrypted first identity data (Enc(pk, HE.Enc(PK, id_1))), wherein the second data provider computer uses a second secret key (sk) to remove a layer of encryption from the doubly encrypted first identity data to retrieve singly encrypted first identity data (HE.Enc(PK, id_1)) and thereafter uses second identity data and the first public key (PK) to generate an encrypted comparison between the first identity data and the second identity data (HE.Enc(PK, f(id_1, id_2))); receiving, by the server computer from the second data provider computer, the encrypted comparison between the first identity data and the second identity data (HE.Enc(PK, f(id_1, id_2))); and decrypting, by the server computer, the encrypted comparison between the first identity data and the second identity data (HE.Enc(PK, f(id_1, id_2))) using the first secret key (SK) to retrieve a comparison between the first identity data and the second identity data (f(id_1, id_2)).

Figure 6:
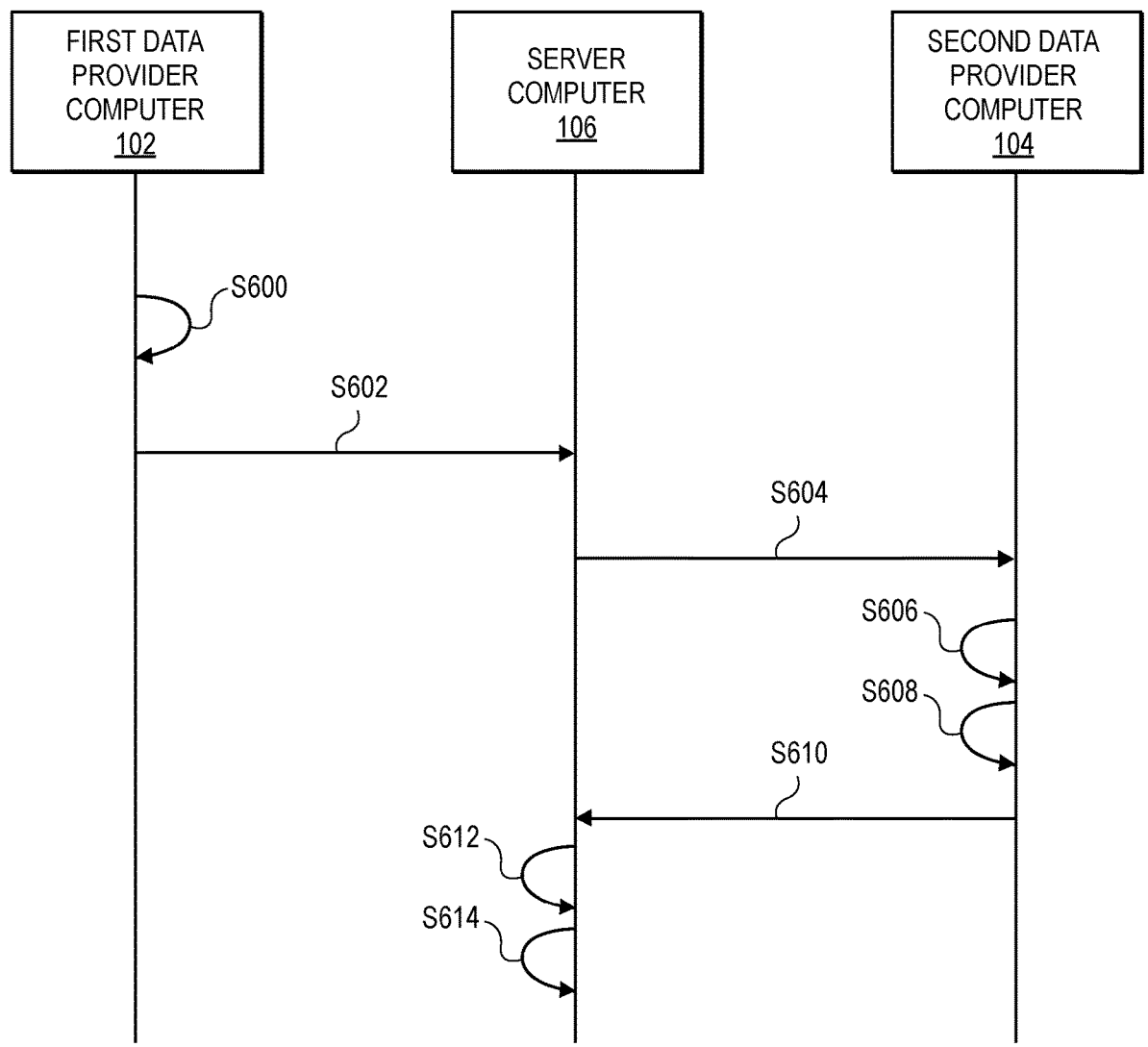
FIG. 6 shows a flowchart illustrating second details of a data deduplication method according to embodiments.

FIG. 6 shows a flowchart for a second data deduplication method according to embodiments. The method illustrated in FIG. 6 will be described in the context of performing a deduplication method utilizing a symmetric-key function private functional encryption (FE) scheme. It is understood, however, that embodiments of the invention can be applied to other circumstances. Symmetric-key function private functional encryption (FE), denoted by FE. Enc, can be used to securely encrypt identity data and allow for secure encrypted domain processing on the identity data.

Example FE processing schemes can include 1) a purely symmetric-key solution (e.g., for distance measures including equality and wild card matching) as described in Shangqi Lai, et. al., "Result Pattern Hiding Searchable Encryption for Conjunctive Queries," 2018 ACM SIGSAC Conference on Computer and Communications Security (CCS '18), Oct. 15-19, 2018, Toronto, ON, Canada. ACM, New York, NY, USA, 21 pages. https://doi.org/10.1145/3243734.3243753, and also in Cryptology ePrint Archive, Report 2018/1168, 2) function private inner product FE (e.g., for distance measures including inner-products, cosine similarity, Hamming distance over bit-type strings) as described in Shashank Agrawal, et. al., "Functional Encryption and Property Preserving Encryption: New Definitions and Positive Results," Cryptology ePrint Archive, Report 2013/744, and 3) single-key succinct FE (e.g., for arbitrary distance measures), and/or the like.

Functional encryption (FE) is a generalization of public-key encryption in which possessing a secret key allows a computer to learn a functional output of what is included in the ciphertext. FE supports restricted decryption keys that allow computers to learn specific functions of the encrypted messages.

The first data provider computer 102 may hold first identity data, id_1, of the user. The second data provider computer 104 may hold second identity data, id_2, of the user. The second data provider computer 104 may be associated with a public/secret key pair, such as a second public key, pk, and a second secret key, sk, used for a public key encryption scheme.

Prior to step S600, the first data provider computer 102 may retrieve the second public key pk. For example, the first data provider computer 102 may either communicate with the second data provider computer 104 to retrieve the second public key pk or the first data provider computer 102 may retrieve the second public key pk from memory. The first data provider computer 102 may then sample a master secret key MSK for the FE scheme. The first data provider computer 102 can sample (e.g., create) the master secret key MSK using any suitable cryptographic key generation process (e.g., a symmetric key generation process).

At step S600, the first data provider computer 102 can encrypt the first identity data id_1 using the master secret key MSK in an FE scheme to generate encrypted first identity data FE. Enc (MSK, id_1) (which is an example of encrypted data). The first data provider computer 102 may then encrypt the master secret key MSK using the public key pk in a public key encryption scheme to generate an encrypted master secret key, Enc(pk, MSK) (which is an example of a derivative of a cryptographic key, where the cryptographic key is the master secret key).

At step S602, after generating the encrypted data FE. Enc (MSK, id_1) and the encrypted master secret key Enc(pk, MSK), the first data provider computer 102 may transmit the encrypted data FE.Enc(MSK, id_1) and the encrypted master key Enc(pk, MSK) to the server computer 106. In some embodiments, the first data provider computer 102 may use a signing/verification key pair to generate a digital signature on the encrypted data FE.Enc(MSK, id_1) and the encrypted master secret key Enc(pk, MSK).

At step S604, after receiving the encrypted data FE.Enc (MSK, id_1) and the encrypted master secret key Enc(pk, MSK) from the first data provider computer 102, the server computer 106 may transmit the encrypted master secret key Enc(pk, MSK) to the second data provider computer 104. The server computer 106 can transmit the encrypted master secret key to the second data provider computer 104 to initiate a data deduplication process for encrypted identity data. In some embodiments, the server computer 106 can provide the encrypted master secret key Enc(pk, MSK) to the second data provider computer 104 along with encrypted second identity data so that the second data provider computer 104 knows which second identity data that the server computer 106 is attempting to deduplication.

In some embodiments, before transmitting the encrypted master secret key Enc(pk, MSK), the server computer 106 can verify the authenticity of the data received from the first data provider computer 102. For example, the server computer 106 may retrieve the verification key of the first data provider computer 102 to verify the digital signature on the encrypted data FE.Enc(MSK, id_1) and the encrypted master secret key Enc(pk, MSK).

At step S606, after receiving the encrypted master secret key Enc(pk, MSK) from the server computer 106, the second data provider computer 104 may decrypt the encrypted master secret key Enc(pk, MSK) using the secret key sk to retrieve the master secret key MSK.

At step S608, the second data provider computer 104 may then use the FE scheme to generate a restricted secret key FE. Gen (MSK, f (., id_2)) using the second identity data id_2 and the master secret key MSK. The restricted secret key can be an example of intermediate data. The restricted secret key can allow a device to perform a mathematical operation on input data "." The mathematical operation can be a comparison function f (., id_2) between the input data "." and the second identity data id_2. The restricted secret key can allow access to a function that operates on the encrypted data within the function. The key is restricted because the device cannot access plaintext data associated with the encrypted data.

At step S610, after generating the intermediate data, which is the restricted secret key FE.Gen(MSK, f(., id_2)), the second data provider computer 104 may transmit the intermediate data FE.Gen(MSK, f(., id_2)) to the server computer 106.

At step S612, after receiving the intermediate data FE.Gen(MSK, f(., id_2)) (e.g., the restricted secret key) from the second data provider computer 104, the server computer 106 may apply the restricted secret key FE.Gen (MSK, f(., id_2)) to the encrypted first identity data FE.Enc (MSK, id_1)) to obtain a comparison value f(id_1, id_2) between the first identity data id_1 and the second identity data id_2.

The comparison value f(id_1, id_2) between the first identity data id_1 and the second identity data id_2 may be used to determine if the first identity data id_1 and the second identity data id_2 are duplicate data while the first identity data id_1 and the second identity data id_2 remain encrypted.

At step S614, if the distance measure, f( ), is equality then the result will be either True or False. If the result is True, then the first identity data id_1 and the second identity data id_2 are the same, and thus the server computer 106 may remove either the first identity data id_1, or the second identity data id_2 from memory. If the result is False, the first identity data id_1 and the second identity data id_2 are not the same, and thus the server computer 106 may maintain both the first identity data id_1 and the second identity data id_2 in memory.

As an example, the method illustrated in FIG. 6 can comprise receiving, by a server computer from a first data provider computer, encrypted first identity data (FE.Enc (MSK, id_1)) and an encrypted master secret key (Enc(pk, MSK)), wherein the encrypted first identity data comprises first identity data (id_1) encrypted using the master secret key (MSK), and wherein the encrypted master secret key comprises a master secret key (MSK) encrypted using a public key (pk); transmitting, by the server computer to a second data provider computer, the encrypted master secret key (Enc(pk, MSK)), wherein the second data provider decrypts the encrypted master secret key using a secret key (sk) to retrieve the master secret key (MSK) and thereafter uses second identity data (id_2) and the master secret key (MSK) to generate a restricted secret key (FE. Gen (MSK, f (., id_2))); receiving, by the server computer from the second data provider computer, the restricted secret key (FE.Gen(MSK, f(., id_2))); and decrypting, by the server computer, the encrypted first identity data (FE.Enc(MSK, id_1)) using the restricted secret key (FE.Gen(MSK, f(., id_2))) to retrieve a comparison between the first identity data and the second identity data (f(id_1, id_2)).

Figure 7:
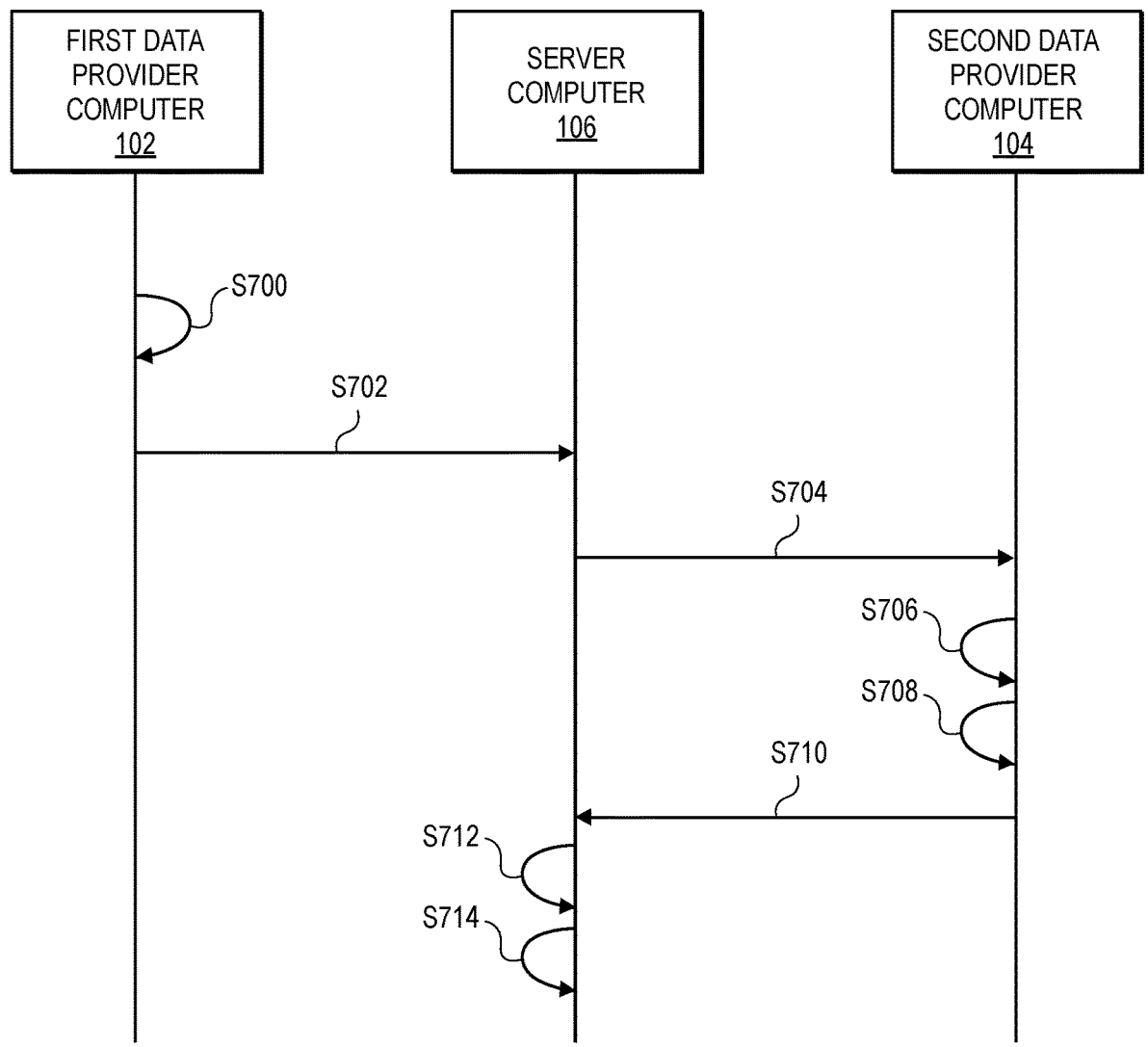
FIG. 7 shows a flowchart illustrating third details of a data deduplication method according to embodiments.

FIG. 7 shows a flowchart for a third data deduplication method according to embodiments. The method illustrated in FIG. 7 will be described in the context of performing a deduplication method utilizing a public key encryption with equality tests (PKEETs) scheme. It is understood, however, that the invention can be applied to other circumstances. Public key encryption and public key encryption with equality testing (PKEET) can be utilized to securely and secretly evaluate the equivalence of two pieces of encrypted identity data. The PKEET scheme may allow for equality tests to be performed in the encrypted domain, resulting in an equality result in the plaintext domain, without revealing the underlying equality test that was performed.

The first data provider computer 102 may hold first identity data id_1 of a user of a user device. The second data provider computer 104 may hold second identity data id_2 of the user. The second data provider computer 104 may be associated with a public/secret key pair, such as a second public key pk and a second secret key sk used for a public key encryption scheme.

Prior to step S700, the first data provider computer 102 may retrieve the second public key pk. For example, the first data provider computer 102 may either communicate with the second data provider computer 104 to retrieve the second public key pk or the first data provider computer 102 may retrieve the second public key pk from memory.

At step S700, the first data provider computer 102 can generate a public/secret key pair for a PKEET scheme. In particular, the first data provider computer 102 can generate a first public key PK, a first secret key SK, and a trapdoor TD. The first data provider computer 102 can use the PKEET scheme to encrypt first identity data id_1 using the first public key PK to generate encrypted data PKEET.Enc (PK, id_1). The first data provider computer 102 can also encrypt the first public key PK using the second public key pk to generate an encrypted first public key Enc(pk, PK).

At step S702, after generating the encrypted data PKEET.Enc(PK, id_1) and the encrypted first public key Enc(pk, PK), the first data provider computer 102 can transmit the trapdoor TD, the encrypted data PKEET.ENC (PK, id_1), and the encrypted first public key Enc(pk, PK) to the server computer 106. In some embodiments, the first data provider computer 102 may use a signing/verification key pair to generate a digital signature on the trapdoor TD, the encrypted data PKEET.Enc(PK, id_1), and the encrypted first public key Enc(pk, PK).

In step S704, after receiving the trapdoor TD, the encrypted data PKEET.Enc(PK, id_1), and the encrypted first public key Enc(pk, PK) from the first data provider computer 102, the server computer 106 may transmit the encrypted first public key Enc(pk, PK) to the second data provider computer 104. In some embodiments, before transmitting the encrypted first public key, the server computer 106 may verify the authenticity of the data received from the first data provider computer 102. For example, the server computer 106 may retrieve the verification key of the first data provider computer 102 to verify the digital signature on the trapdoor TD, the encrypted data PKEET.Enc(PK, id_1), and the encrypted first public key Enc(pk, PK).

At step S706, after receiving the encrypted first public key from the server computer 106, the second data provider computer 104 may decrypt the encrypted first public key Enc(pk, PK) using the second secret key sk to retrieve the first public key PK.

At step S708, after obtaining the first public key PK, the second data provider computer 104 may then use the PKEET scheme to encrypt the second identity data id_2 using the first public key PK to generate intermediate data PKEET.Enc(PK, id_2).

In step S710, after generating the intermediate data, the second data provider computer 104 may transmit the intermediate data PKEET.Enc(PK, id_2) to the server computer 106.

At step S712, after receiving the intermediate data from the second data provider computer 104, the server computer 106 may compare the encrypted data PKEET.Enc(PK, id_1) to the intermediate data PKEET.Enc(PK, id_2) using the trapdoor TD to obtain a comparison value between the first identity data and the second identity data embodied within the encrypted data and the intermediate data, respectively. As such, responsive to receiving the intermediate data, the server computer 106 can determine if the first identity data id_1 and the second identity data id_2 are duplicates while the first identity data id_1 and the second identity data id_2 are encrypted.

For example, the server computer 106 can compare the encrypted data PKEET.Enc(PK, id_1) to the intermediate data PKEET.Enc(PK, id_2) using the trapdoor TD by performing a PKEET equality test. A PKEET equality test can utilize the trapdoor TD and two ciphertexts (e.g., the encrypted data PKEET.Enc(PK, id_1) and the intermediate data PKEET.Enc(PK, id_2)) to determine if they are equal. The PKEET equality test can perform the following steps to determine whether or not the two ciphertexts include equal plaintext (e.g., matching identity data).

The PKEET equality test can perform a key extraction process on the encrypted data PKEET.Enc(PK, id_1) and on the intermediate data PKEET.Enc(PK, id_2). The key extraction process can take the trapdoor and the first data provider computer's public key as input (e.g., KeyExt(td, PK)) to obtain a key capable of obtaining a derivative of the encrypted data (e.g., a hash of the data of the plaintext data that was encrypted). Similarly, the key extraction process can take the trapdoor and the second data provider computer's public key as input (e.g., KeyExt(td, pk)) to obtain a key capable of obtaining a derivative of the intermediate data.

The server computer 106 can then continue with the PKEET equality test by applying the key capable of obtaining a derivative of the encrypted data to the encrypted data PKEET.Enc(PK, id_1). By doing so, the server computer 106 can access a hashed version of the first identity data H (id_1). Similarly, the server computer 106 can apply the key capable of obtaining a derivative of the intermediate data to the intermediate data PKEET.Enc(PK, id_2). By doing so, the server computer 106 can access a hashed version of the second identity data H (id_2). For further information regarding public key encryption with equality tests (PKEET) see "Public Key Encryption with Equality Test in the Standard Model" by Hyung Tae Lee et al, Information Sciences: an International Journal Volume 516, Issue C, April 2020, pp 89-108; https://doi.org/10.1016/j.ins.2019.12.023, which is incorporated by reference herein.

The server computer 106 can then compare the hashed version of the first identity data H (id_1) with the hashed version of the second identity data H (id_2). If the values match, then the server computer 106 can deduce that the identity data held within the hashes match.

At step S714, responsive to determining if the first identity data id_1 and the second identity data id_2 are duplicates while the first identity data id_1 and the second identity data id_2 are encrypted, the server computer can remove one of the encrypted first identity data, derived from the first identity data, and encrypted second identity data, derived from the second identity data, from a memory in the server computer 106. For example, the comparison between the first identity data id_1 and the second identity data id_2 can be used to determine if the first identity data id_1 and the second identity data id_2 are duplicate data. For example, the result of the comparison can be either True or False. If the result is True, then the first identity data id_1 and the second identity data id_2 are the same and thus the server computer 106 may remove either the first identity data id_1, or the second identity data id_2 from memory. If the result is False, the first identity data id_1 and the second identity data id_2 are not the same, and thus the server computer 106 may maintain both the first identity data id_1 and the second identity data id_2 in memory.

For example, the method illustrated in FIG. 7 can comprise receiving, by a server computer from a first data provider computer, a trapdoor (TD), encrypted first identity data (PKEET.Enc(PK, id_1)), and an encrypted first public key (Enc(pk, PK)), wherein the encrypted first identity data comprises first identity data (id_1) encrypted using the first public key (PK), and wherein the encrypted first public key comprises a first public key (PK) encrypted using a second public key (pk); transmitting, by the server computer to a second data provider computer, the encrypted first public key (Enc(pk, PK)), wherein the second data provider computer decrypts the encrypted first public key using a second secret key (sk) to retrieve the first public key (PK) and thereafter uses second identity data (id_2) and the first public key (PK) to generate encrypted second identity data (PKEET.Enc(PK, id_2)); receiving, by the server computer from the second data provider computer, the encrypted second identity data; comparing, by the server computer, the encrypted first identity data (PKEET.Enc(PK, id_1)) to the encrypted second identity data (PKEET.Enc(PK, id_2)) using the trapdoor to retrieve a comparison between the first identity data and the second identity data (id_1=id_2).

Embodiments provide for a number of advantages. For example, embodiments provide for decreased memory usage and increased privacy and data security. The server computer can remove duplicate sensitive identity data while the identity data remains encrypted and unknown to the server computer.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:
1. A method comprising:
receiving, by a server computer from a first data provider computer, encrypted data derived from first identity data and a cryptographic key or derivative thereof stored at the first data provider computer;
transmitting, by the server computer to a second data provider computer, the encrypted data and/or the cryptographic key or derivative thereof;
responsive to transmitting the encrypted data and/or the cryptographic key, receiving, by the server computer from the second data provider computer, intermediate data derived from second identity data stored at the second data provider computer;
responsive to receiving the intermediate data, determining, by the server computer, if the first identity data and the second identity data are duplicates while the first identity data and the second identity data are encrypted; and responsive to determining if the first identity data and the second identity data are duplicates while the first identity data and the second identity data are encrypted, removing, by the server computer, one of the first identity data in encrypted form, and the second identity data in encrypted form from a memory in the server computer.

2. The method of claim 1, wherein the cryptographic key or derivative thereof is a first public key, wherein the encrypted data is the first identity data that is doubly encrypted, and wherein receiving the encrypted data and the cryptographic key or derivative thereof comprises:

receiving, by the server computer, the doubly encrypted first identity data, the first public key, and a first secret key from the first data provider computer, wherein the doubly encrypted first identity data comprises the first identity data encrypted using the first public key and a second public key.

3. The method of claim 2, wherein transmitting, to the second data provider computer, the doubly encrypted first identity data and/or the first public key comprises:

transmitting, by the server computer, the first public key and the doubly encrypted first identity data to the second data provider computer, and wherein in the method the second data provider computer uses a second secret key to remove a layer of encryption from the doubly encrypted first identity data to retrieve singly encrypted first identity data and thereafter uses second identity data and the first public key to generate the intermediate data based on the first identity data and the second identity data.

4. The method of claim 3, wherein determining if the first identity data and the second identity data are duplicates while the first identity data and the second identity data are encrypted comprises:

decrypting, by the server computer, the intermediate data using the first secret key to retrieve a comparison value between the first identity data and the second identity data, which indicates if the first identity data and the second identity data are duplicates.

5. The method of claim 1, wherein the cryptographic key or derivative thereof is an encrypted master secret key and wherein receiving the encrypted data and the cryptographic key or derivative thereof comprises:

receiving, by the server computer, the encrypted data and the encrypted master secret key, wherein the encrypted first identity data comprises the first identity data encrypted using a master secret key, and wherein the encrypted master secret key comprises the master secret key encrypted using a public key.

6. The method of claim 5, wherein transmitting, to the second data provider computer, the encrypted data and/or the cryptographic key or derivative thereof comprises:

transmitting, by the server computer to the second data provider computer, the encrypted master secret key, and wherein in the method the second data provider computer decrypts the encrypted master secret key using a secret key to retrieve the master secret key and uses the second identity data and the master secret key to generate the intermediate data, wherein the intermediate data is a restricted secret key.

7. The method of claim 6, wherein determining if the first identity data and the second identity data are duplicates while the first identity data and the second identity data are encrypted comprises:

decrypting, by the server computer, the encrypted data using the restricted secret key to retrieve a comparison value between the first identity data and the second identity data that indicates if the first identity data and the second identity data are duplicates.

8. The method of claim 1, wherein the cryptographic key or derivative thereof is an encrypted first public key, and wherein receiving the encrypted data and the cryptographic key or derivative thereof comprises:

receiving, by the server computer from the first data provider computer, a trapdoor, the encrypted data, and the encrypted first public key, and wherein in the method, the encrypted data comprises the first identity data encrypted using a first public key, and wherein the encrypted first public key comprises the first public key encrypted using a second public key.

9. The method of claim 8, wherein transmitting, to the second data provider computer, the encrypted data and/or the cryptographic key or derivative thereof comprises:

transmitting, by the server computer to the second data provider computer, the encrypted first public key, and wherein in the method the second data provider computer decrypts the encrypted first public key using a second secret key to retrieve the first public key and thereafter uses second identity data and the first public key to generate intermediate data.

10. The method of claim 9, wherein determining if the first identity data and the second identity data are duplicates while the first identity data and the second identity data are encrypted further comprises:

comparing, by the server computer, the encrypted data to the intermediate data using the trapdoor to retrieve a comparison value between the first identity data and the second identity data that indicates if the first identity data and the second identity data are duplicates.

11. The method of claim 1, wherein the first identity data includes data associated with a first user, wherein the second identity data includes data associated with a second user, and wherein if the first identity data and the second identity data are duplicates the first user is the second user.

12. The method of claim 1, wherein prior to receiving the encrypted data and the cryptographic key or derivative thereof, the method further comprises:

receiving, by the server computer, the encrypted first identity data from the first data provider computer; and receiving, by the server computer, the encrypted second identity data from the second data provider computer.

13. The method of claim 12 further comprising:

after receiving the encrypted first identity data and the encrypted second identity data, storing the encrypted first identity data and the encrypted second identity data into the memory; and prior to receiving the encrypted data derived from the first identity data and the cryptographic key or derivative thereof, determining to perform a data deduplication process on the encrypted first identity data and the encrypted second identity data.

14. The method of claim 13 further comprising:

generating a data deduplication request message requesting the encrypted data derived from the first identity data and the cryptographic key or derivative thereof; and providing the data deduplication request message to the first data provider computer.

15. A server computer comprising:
a processor; and
a computer-readable medium coupled to the processor, the computer-readable medium comprising code executable by the processor for implementing operations comprising:
  receiving, from a first data provider computer, encrypted data derived from first identity data and a cryptographic key or derivative thereof stored at the first data provider computer;
  transmitting, to a second data provider computer, the encrypted data and/or the cryptographic key or derivative thereof;
  responsive to transmitting the encrypted data and/or the cryptographic key, receiving, from the second data provider computer, intermediate data derived from second identity data stored at the second data provider computer;
  responsive to receiving the intermediate data, determining if the first identity data and the second identity data are duplicates while the first identity data and the second identity data are encrypted; and
  responsive to determining if the first identity data and the second identity data are duplicates while the first identity data and the second identity data are encrypted, removing one of encrypted first identity data, derived from the first identity data, and encrypted second identity data, derived from the second identity data, from a memory in the server computer.

16. A method comprising:
receiving, by a data provider computer from a server computer,
encrypted data derived from first identity data and/or a cryptographic key or derivative thereof;
determining, by the data provider computer, intermediate data using the encrypted data and/or the cryptographic key or derivative thereof and second identity data; and
providing, by the data provider computer, the intermediate data to the server computer, wherein the server computer determines if the first identity data and the second identity data are duplicates while the first identity data and the second identity data are encrypted and removes one of encrypted first identity data, derived from the first identity data, and encrypted second identity data, derived from the second identity data, from a memory in the server computer.

17. The method of claim 16, wherein receiving the encrypted data derived from the first identity data and/or the cryptographic key or the derivative thereof comprises:
receiving, by the data provider computer from the server computer, encrypted second identity data and the encrypted data derived from the first identity data and/or the cryptographic key or derivative thereof.

18. The method of claim 16, wherein the encrypted data includes double encrypted first identity data, wherein determining the intermediate data comprises:
decrypting, by the data provider computer, the double encrypted first identity data using a secret key of the data provider computer to remove a layer of encryption from the double encrypted first identity data to obtain singly encrypted first identity data; and
generating, by the data provider computer, the intermediate data using the second identity data and a first public key of a different data provider computer associated with the first identity data.

19. The method of claim 16, wherein the cryptographic key or derivative thereof includes an encrypted master secret key, wherein determining the intermediate data comprises:
decrypting, by the data provider computer, the encrypted master secret key using a secret key of the data provider computer to retrieve a master secret key; and
generating, by the data provider computer, the intermediate data using the second identity data and the master secret key, wherein the intermediate data is a restricted secret key.

20. The method of claim 16, wherein the cryptographic key or derivative thereof includes an encrypted first public key, wherein determining the intermediate data comprises:
decrypting, by the data provider computer, the encrypted first public key using a secret key of the data provider computer to retrieve a first public key; and
generating, by the data provider computer, the intermediate data using the second identity data and the first public key, wherein the intermediate data is encrypted second identity data.

* * * * *